(12) United States Patent
White et al.

(10) Patent No.: US 6,412,432 B1
(45) Date of Patent: Jul. 2, 2002

(54) SNAP HOOK APPLICATOR DEVICE

(76) Inventors: Del White, c/o REDCO, 3000 Arrowhead Dr., Carson City, NV (US) 89706-0482; Paul A. Getchel, c/o Idea Solutions Design, 685 Placerville Dr., Suite 412, Placerville, CA (US) 95667-4231

( * ) Notice: Subject to any disclaimer, the term of this patent is extended or adjusted under 35 U.S.C. 154(b) by 0 days.

(21) Appl. No.: 09/776,790

(22) Filed: Feb. 2, 2001

(51) Int. Cl.[7] .................................. B63B 9/00
(52) U.S. Cl. .................. 114/221 R; 294/19.1
(58) Field of Search .............. 114/221 R, 230.1; 294/19.1

(56) References Cited

U.S. PATENT DOCUMENTS

| | | | |
|---|---|---|---|
| 3,913,515 A | 10/1975 | Hernsjö et al. | |
| D302,231 S | 7/1989 | Millar, Jr. | |
| 4,986,207 A | 1/1991 | Reed | |
| 5,116,260 A | 5/1992 | Upchurch | |
| 5,190,330 A | 3/1993 | Dunham | |
| D338,602 S | 8/1993 | Schaumburg | |
| 5,622,399 A | 4/1997 | Albright | |
| 5,820,181 A | * 10/1998 | Le Noach | 294/19.1 |
| 5,823,592 A | 10/1998 | Kalidindi | |
| 5,967,575 A | 10/1999 | Blake | |
| 6,027,154 A | * 2/2000 | Costa | 294/19.1 |
| 6,055,762 A | 5/2000 | Philpot | |

* cited by examiner

*Primary Examiner*—Stephen Avila
(74) *Attorney, Agent, or Firm*—Dorsey & Whitney LLP

(57) ABSTRACT

An applicator device (30) for coupling a snap hook (31) to a hook connector (32). The applicator device includes an applicator head and a receptacle (44). The applicator head defines a snap hook receiving receptacle (44) which is formed to position the snap hook (31) for, and to support the snap hook (31) during, coupling of the snap hook (31) to the hook connector (32) while the snap hook is engaged in the receptacle (44). The receptacle (44) is further formed for disengagement of the applicator head (30) from the snap hook while the snap hook is coupled to the hook connector upon displacement of the applicator head in a direction lateral to the snap hook. A method of using the applicator device is also disclosed.

22 Claims, 4 Drawing Sheets

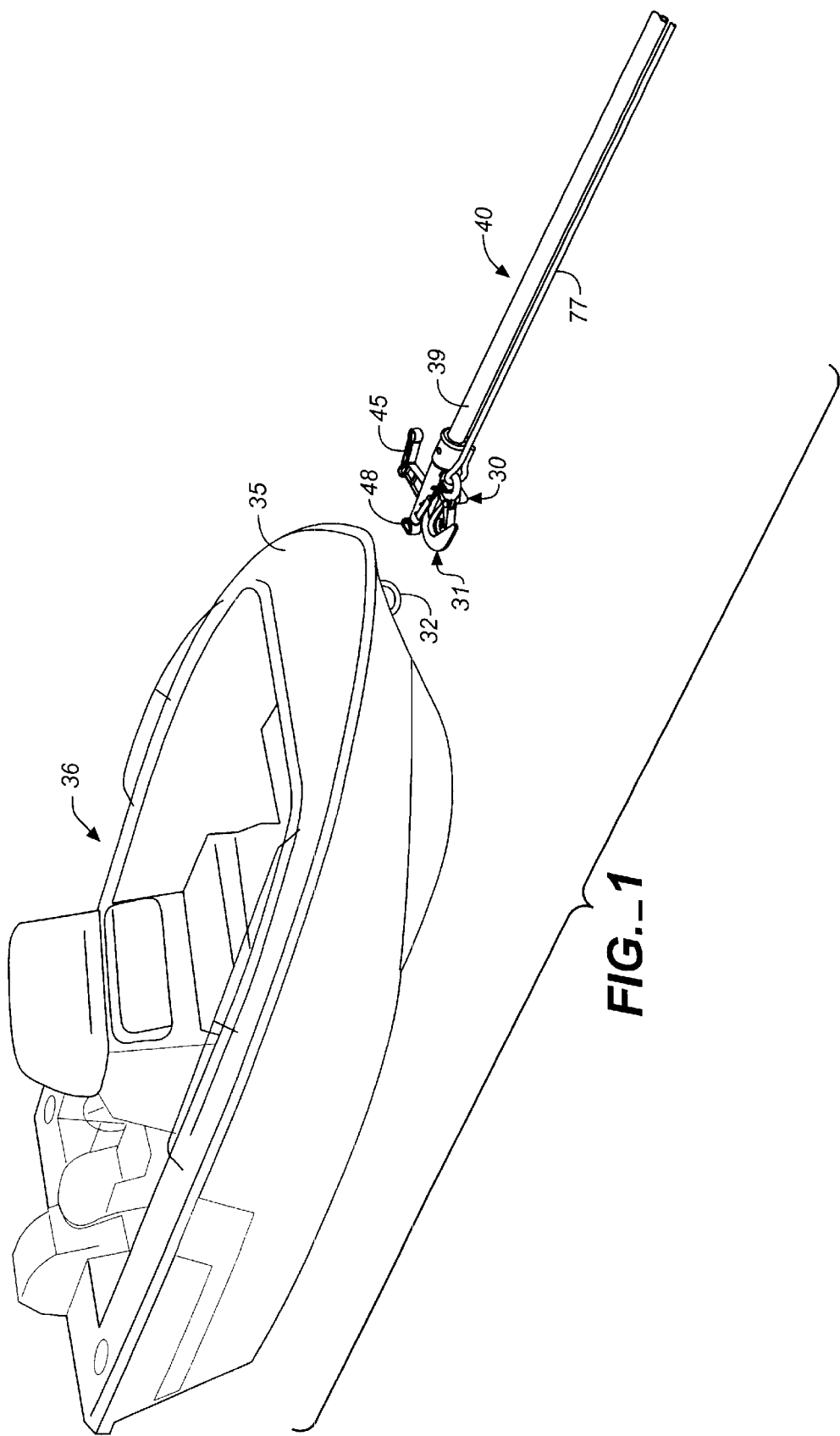
FIG._1

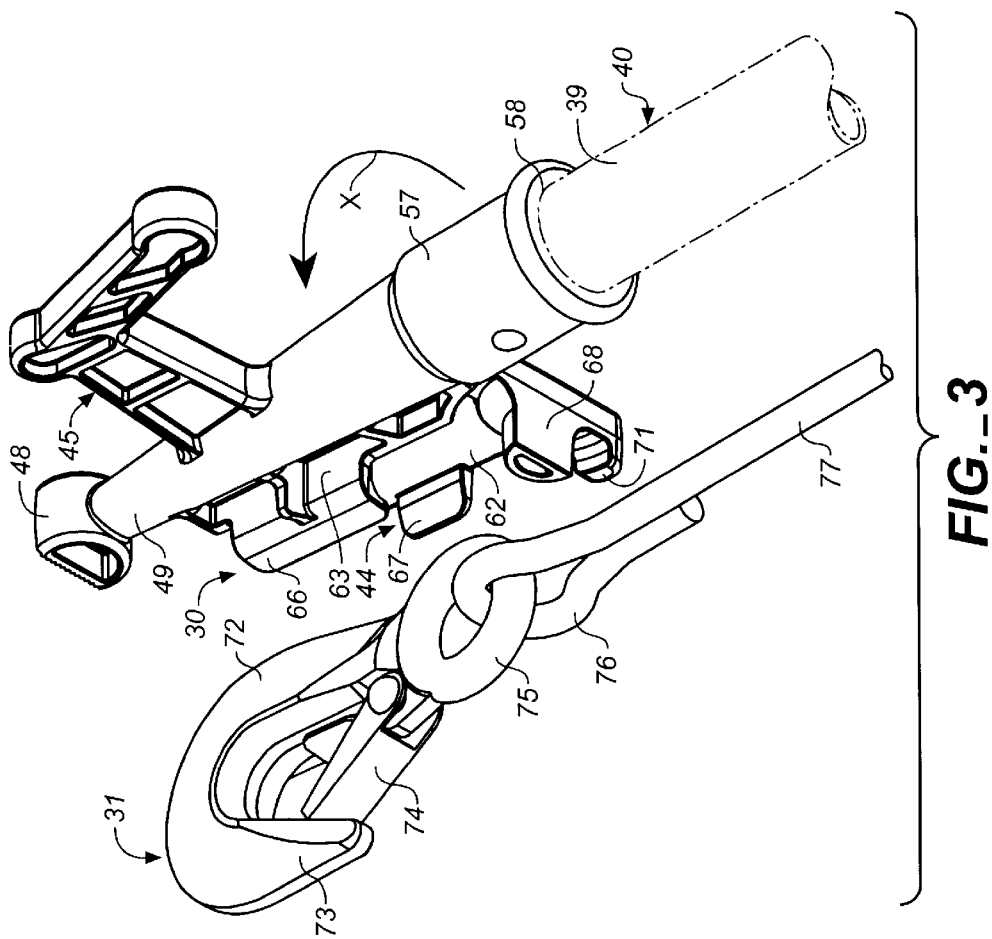
FIG._3
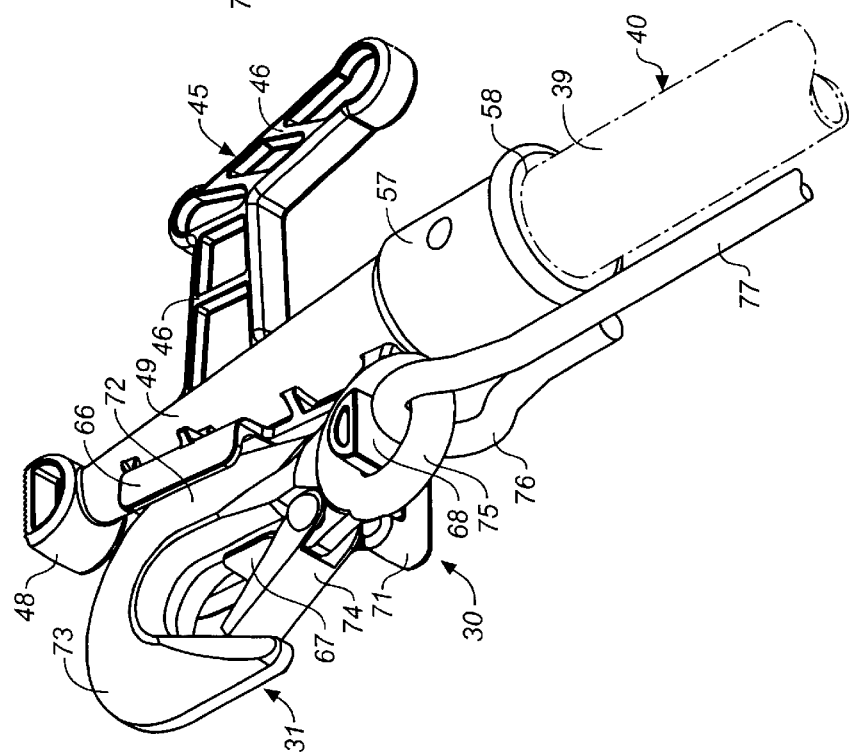
FIG._2

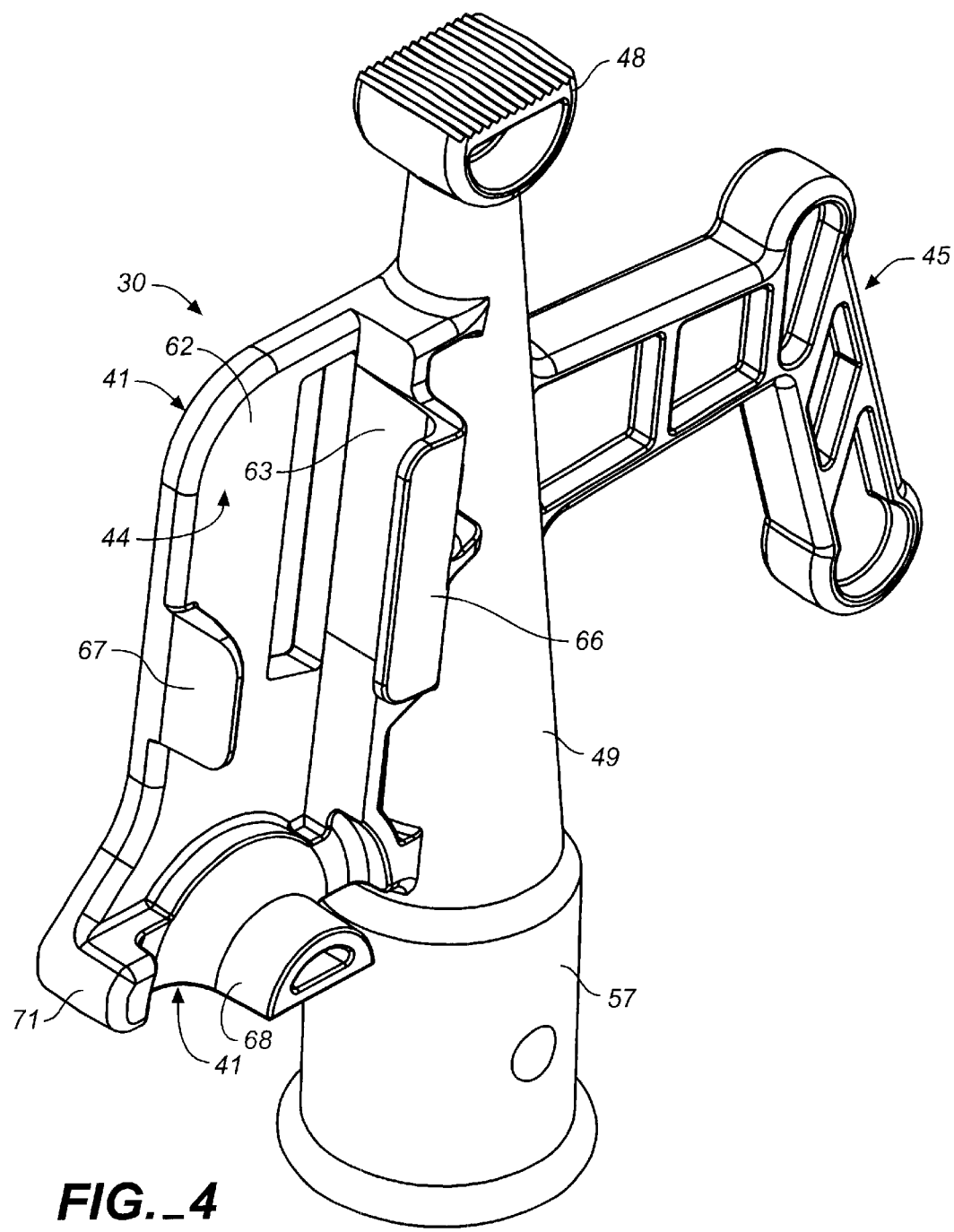
FIG._4

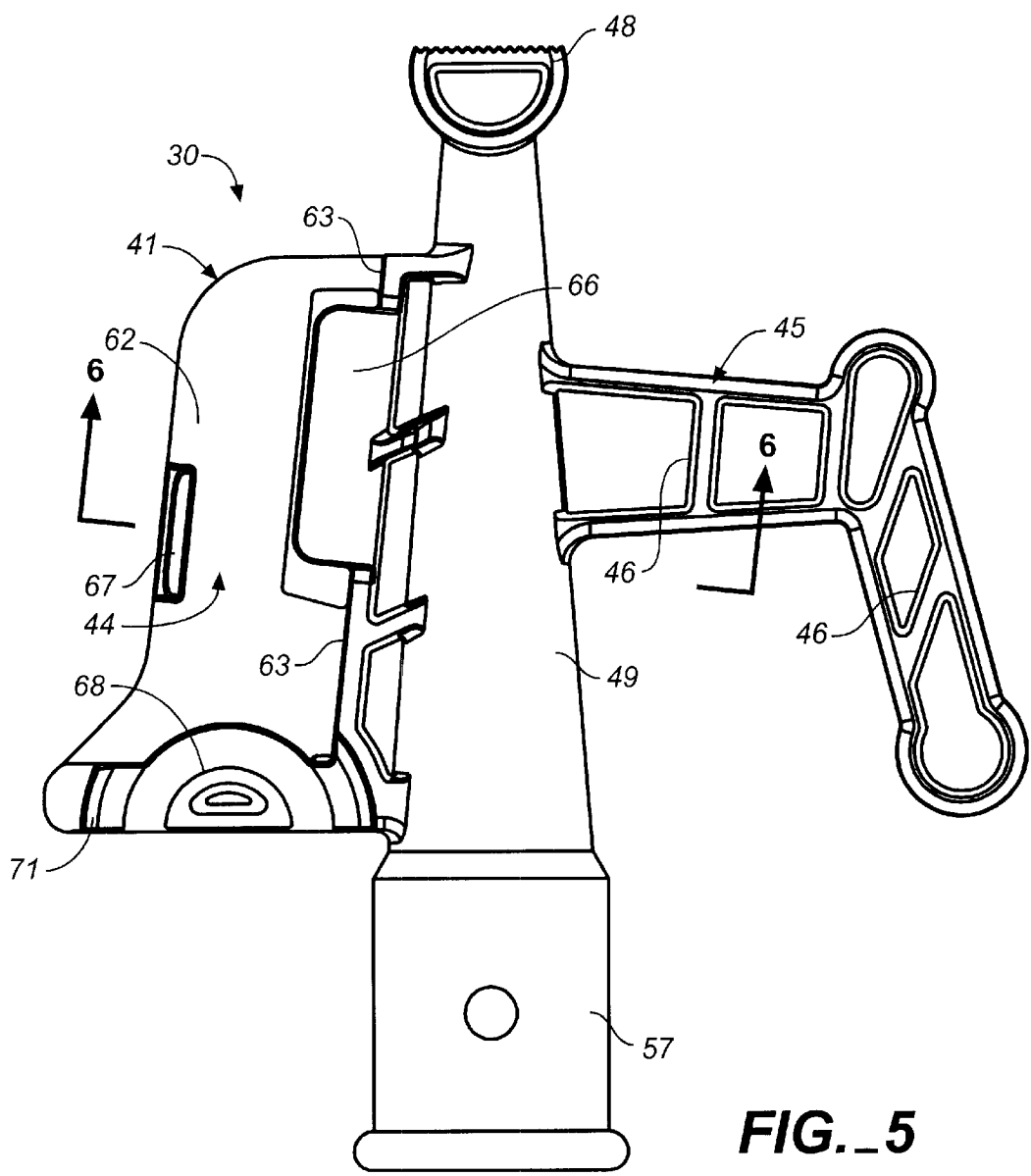
*FIG._5*
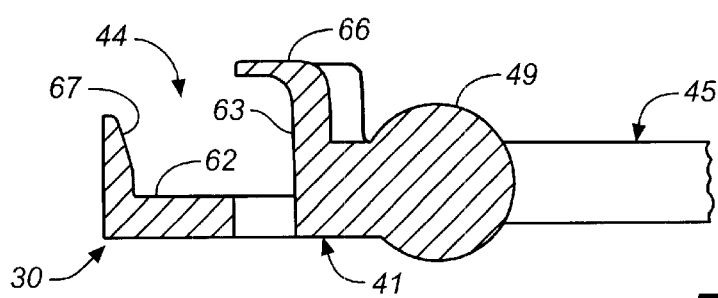
*FIG._6*

SNAP HOOK APPLICATOR DEVICE

BACKGROUND OF THE INVENTION

1. Field of the Invention

The present invention relates to an applicator device for coupling a snap hook to a hook connector. In particular, the present invention relates to a snap holder assembly for connecting a snap hook to a bow eyelet of a boat.

2. Description of Related Art

Boats and other water borne vehicles generally utilize an eyelet located at the bow thereof for providing a releasable connection to which a winch line, mooring line, or other securing line can be attached. Such securing lines generally have a snap hook provided at its remote end. The snap hook is configured to engage the bow eyelet in a selectively releasable manner.

In the case of a winch line, the other end of the line is secured to a winch often located on a boat trailer in a conventional manner. In operation, the snap hook is used to releasably secure the remote end of the winch line to the eyelet located on the bow of a boat in order to pull the boat onto a boat trailer. Mounting a boat on a boat trailer can be a difficult process, particularly for an individual, because the boat trailer must be partially submerged in water while on a boat ramp, and the boat often cannot be pulled onto the trailer without the individual having to wade into the water to attach the snap hook to the boat eyelet. Boat hook and placement pole assemblies are sometimes used to pull a boat within the reach of a user, but snapping the winch snap hook to the boat eyelet still is difficult to accomplish.

Devices are known which are used to connect snap hooks to remotely located eyelets. Exemplars of such prior devices are U.S. Pat. No. 3,913,515 to Hemsjö et al. which shows a snap-hook holder, U.S. Pat. No. 4,986,207 to Reed which shows a boat hook device, U.S. Pat. No. 5,190,330 to Dunham which shows a tool for connecting a snap-hook to a remote eye, and U.S. Pat. No. 5,967,575 to Blake which shows a device for grabbing a hook supported by an object. Each of these devices utilizes a mechanical latching mechanism to releasably secure a snap hook thereto. Disadvantageously, such devices have moving parts which are prone to wear and/or damage. Moreover, some of these prior art devices orient or hold the snap hook in a manner which causes the snap hook to apply a force to the boat, pushing it away from the trailer in order to depress the latching mechanism of the snap hook. This can be disastrous if an individual on shore pushes the unmanned boat away from the boat ramp.

SUMMARY OF THE INVENTION

In summary, one aspect of the present invention is directed to an applicator device for coupling a snap hook to a hook connector. The applicator device includes an applicator head and a receptacle. The applicator head defines a snap hook receiving receptacle which is formed to position the snap hook for, and to support the snap hook during, coupling of the snap hook to the hook connector while the snap hook is engaged in the receptacle. The receptacle is further formed for disengagement of the applicator head from the snap hook while the snap hook is coupled to the hook connector upon displacement of the applicator head in a direction lateral to the snap hook. The present invention is also directed to a method of using the applicator device.

Another aspect of the present invention is directed to a snap hook holder includes a hook receptacle and an eyelet stud. The hook receptacle is configured and dimensioned to position the snap hook in the receptacle for coupling to the hook connector. The eyelet stud is provided on the hook holder proximate the hook receptacle and is configured and dimensioned to extend into an eyelet provided on the snap hook when the snap hook is engaged in the hook receptacle. The hook receptacle and the eyelet stud are further dimensioned and configured for disengagement of the hook holder from the snap hook upon coupling of the snap hook to the hook connector and upon lateral displacement of the hook holder relative to the snap hook.

Another aspect of the present invention is directed to a combined boat hook and snap hook holder assembly for connecting a snap hook to a bow eyelet of a boat. The boat hook and snap hook holder assembly includes a shank, a pole connector, a pusher end, a boat hook, and a snap hook holder. The pole connector is located at one end of the shank for attachment to a distal end of a placement pole. The pusher is located at the other end of the shank for pushing a boat. The boat hook is attached to one side of the shank for hooking and pulling a boat. The snap hook holder is attached to a side of the shank opposite the boat hook side and includes a base, a side wall extending upward from the base, a holding flange extending from the side wall, an interior or positioning flange extending upward from the base and parallel to the side wall, the side wall, holding flange and positioning flange collectively forming a hook receptacle, and an eyelet stud extending upward from the base for extending through an eyelet of the snap hook when the snap hook is positioned in the hook receptacle. The snap hook holder is dimensioned and configured such that it is easily disengaged from the snap hook by lateral movement or twisting of the holder relative to the snap hook.

An object of the present invention is to provide an applicator device for coupling a snap hook to a hook connector.

It is another object of the present invention to provide an applicator device which can be disengaged from a snap hook while the snap hook is engaged with a hook connecter upon displacement of the applicator device in a direction lateral to the snap hook.

It is yet another object of the present invention to provide an applicator device which can be disengaged from a snap hook while the snap hook is engaged with a hook connector upon twisting the applicator device with respect to the snap hook.

It is further object of the present invention to provide an applicator device having a simplified design and construction.

The accompanying drawings, which are incorporated in and form a part of this specification, illustrate embodiments of the invention and, together with the description, serve to explain the principles of the invention.

BRIEF DESCRIPTION OF THE DRAWINGS

FIG. 1 is a perspective view of a boat and an applicator device for coupling a snap hook to a hook connector which is constructed in accordance with the present invention, the applicator device being mounted on one end of a placement pole.

FIG. 2 is an enlarged perspective view of a snap hook positioned in a receptacle of the applicator device of FIG. 1 with the placement pole shown in phantom.

FIG. 3 is an enlarged perspective view, similar to FIG. 2, of the applicator device after it has been twisted from the position in FIG. 2 and disengaged from the snap hook.

FIG. 4 is a further enlarged perspective view of the applicator device of FIG. 1.

FIG. 5 is a side elevational view of the applicator device of FIG. 1.

FIG. 6 is a cross-sectional view of the applicator device of FIG. 1 taken substantially along the plane of line 6—6 in FIG. 5.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Turning now to the drawings, wherein like components are designated by like reference numerals throughout the various figures, attention is directed to FIG. 1 which discloses an applicator device constructed in accordance with the present invention for coupling a snap hook to a hook connector. In particular, FIG. 1 discloses an applicator device, generally designated 30, for coupling snap hook 31 to a bow eyelet 32 mounted on a bow 35 of a boat 36. The applicator device 30 is mounted on the remote end 39 of a placement pole 40.

As shown in FIGS. 2, 3 and 4, applicator device 30 preferably provided on one side of a main body or shank 49 while a boat hook 45 may advantageously optionally be provided on the other side of shank 49. Snap hook applicator 30 can include an applicator head 41 which defines a snap-hook-receiving receptacle 44 that opens to a side of the head. The embodiment shown FIGS. 2, 3 and 4 is a combined boat hook and snap hook holder assembly which includes other features useful to a boat owner, such as boat hook 45 and a pusher structure or end 48.

A pole connector 57 is located at an end of shank 49. Pole connector 57 advantageously can be a collar defining a socket 58 for receiving a remote end 39 of placement pole 40. Placement pole 40 is connected to placement pole socket 58 by well-known means, such as a rivet, nut and bolt, adhesive, spring pin, or other suitable fastener or fastener method. Although illustrated pole connector 57 is in the form of a cylindrical collar, one should appreciate that other geometries and configurations may be used to attach the assembly to a placement pole. For example, pole connector 57 may be in the form of a plug which is inserted into a socket or bore on remote end 39 of a hollow placement pole, or be threaded, male or female, to remote end 39.

Boat hook 45 is attached to one side of shank 49 and, as shown in FIGS. 2, 3 and 4, is monolithically formed with shank 49, for example, by molding the shank and hook from a thermoplastic material. One should appreciate, however, that the boat hook need not be monolithically formed and can be a two-piece assembly with the shank and/or a three-piece assembly with the applicator device. In order to save weight and material, boat hook 45 is relatively thin and includes several reinforcing webs 46. One should appreciate, however, that the boat hook can be formed in a solid fashion. Boat hook 45 may be used by an individual to hook onto and to pull a boat closer to the individual in a well known manner.

Pusher end 48 is also shown to be monolithically formed with the shank. One should appreciate that pusher 48 need not be a one-piece or monolithic structure with shank 49 and/or the applicator device 30. Pusher 48 has a semi-circular geometry and a textured end which is particularly suited for use by an individual in pushing against a boat and/or for pushing a boat away from another object. One should appreciate that end 48 may also utilize other suitable geometries.

Snap hook applicator device 30 is attached to a side of shank 49 which is opposite to boat hook 45. Applicator device 30 also is preferably monolithically formed with the shank, boat hook and pusher, however as noted above, the applicator device need not be one piece with the other components. The illustrated embodiment is preferably monolithically injection molded of a suitable plastic, such as nylon, acetal, or polyethylene. One should appreciate that the combined boat hook and snap hook holder assembly may by formed of various materials including steel, aluminum, and other suitable alloys, as well as other plastic and composite materials having sufficient strength.

Alternatively, snap hook applicator device 30, constructed in accordance with the present invention, without boat hook 45, also can be mounted directly onto the end of a placement pole by suitable means such as threaded fasteners, adhesives, band clamps, etc.

Turning now to FIGS. 4–6, further details of snap hook applicator device 30 can be described. Head 41 of the applicator includes a snap-hook-receiving receptacle 44 which opens to a side of head 41 and is defined by a base 62, a side wall 63, a holding flange 66, and an interior or positioning flange 67. As shown in FIGS. 2, 4 and 6, side wall 63 and flange 67 extend upwardly from upwardly facing base 62 on opposite sides of the base to define the receptacle. Applicator device 30 further includes an eyelet stud 68 and an eyelet nib 71 which assist or cooperate in positioning and releasably securing snap hook 31 within receptacle 44.

Base 62 is generally planar and extends laterally away from shank 49. Side wall 63 extends substantially perpendicularly from base 62. Holding flange 66 extends substantially perpendicularly from side wall 63 and preferably is substantially parallel to base 62. Positioning flange 67 preferably extends substantially perpendicularly from base 62 and parallel to side wall 63. Together, base 62, side wall 63, holding flange 66 and positioning flange 67 define snap hook receiving receptacle 44 and serve to locate and releasably hold the snap hook. More particularly, a relatively straight segment 72 of snap hook 31 (FIGS. 2 and 3) will be received between side wall 63 opposed side flange 67 of the snap-hook-receiving receptacle 44, while holding flange 66 is superimposed over the outer side of straight segment 72. As may be seen in FIGS. 1 and 3, the hooked segment 73 of the snap hook and spring-biased latching or keeper member 74 are positioned outwardly of base 62 so that the holder exposes hook 73 for coupling to a connector, such as boat eyelet 32, when the snap hook is mounted in the applicator receptacle.

The illustrated base, side walls, and flanges are planar surfaces oriented at substantially right angles with respect to one another. One should appreciate that the surfaces need not be planar nor oriented at substantial right angles. For example, an arcuate member having a shape complementary to the cross-sectional shape of snap hook 31 can be substituted in place of side wall 63 and holding flange 66. Similarly, such an arcuate member can be substituted in place of positioning flange 67.

Snap hooks 31, which are currently in wide spread use in the boating industry for winching boats onto trailers, are formed of varying dimensions made by different manufacturers. Receptacle 44 can be dimensioned to loosely receive a snap hook therein so as to accommodate dimensional variations and so as to facilitate easy removal of the snap hook from receptacle 44, in a manner described herein below. The snap hook receptacle, therefore, is not formed to frictionally engage the snap hook, but instead includes a combination of flanges 66 and 67 which will retrain the snap hook loosely in the pocket and support it as the hook latching member is depressed, for example, by side wall 63 and flange 66. Moreover, as described below, the snap hook can be snubbed up and relatively firmly held in pocket 44 by tensioning winch line 77.

Eyelet stud 68 and eyelet nib 71 also extend substantially perpendicularly from base 62. Eyelet stud 68 is positioned on base 62 such that it extends into, and preferably through, eyelet 75 of snap hook 31 to aid in the positioning and holding of snap hook 31 within snap-hook-receiving receptacle 44. In the illustrated embodiment, eyelet stud 68 has a semicircular shape which allows it to extend through snap hook eyelet 75 without interfering with an end loop 76 of a line 77, which extends through snap hook eyelet 75. One should appreciate that eyelet stud 68 may include various other geometries for positioning snap hook 31 within receptacle 44. For example, the eyelet stud may have a cylindrical-shape, triangular-shape, crescent-shape, or any other suitable shape which positively engages snap hook eyelet 75 but does not interfere with end loop 76. Eyelet nib 71 is similarly positioned on base 62 such that it assists in positioning and holding snap hook 31 within snap-hook-receiving receptacle 44. In particular, eyelet nib 71 extends along an outside surface of snap hook eyelet 75 when snap hook 31 is positioned within receptacle 44, as shown in FIG. 2. Eyelet nib 71 also ensures that boat eyelet 32 enters snap hook 31 through the gate defined between hooked segment 73 and eyelet nib 71 as a user positions snap hook applicator device 30, along with snap hook 31 supported therein, proximate to the remotely located boat eyelet 32, as discussed below.

In operation and use, in order, for example, to facilitate mounting a boat onto a boat trailer, the user rigidly affixes snap hook applicator device 30 to remote end 39 of positioning pole 40, as shown in FIGS. 1–3. Such configuration is particularly well suited for attaching snap hook 31 to bow eyelet 32 of boat 36 when the boat is remotely located from an individual, for example, when boat 36 is out-of-reach of the individual. The individual positions snap hook 31 loosely within snap-hook-receiving receptacle 44, usually with receptacle 44 facing upwardly, such that relatively straight segment 72 of the snap hook is positioned between side wall 63 and positioning flange 67 and is held against base 62 by gravity and holding flange 66. Longitudinal movement of snap hook 31 within hook-receiving receptacle 44 is minimized and/or prevented by eyelet stud 68 which extends through snap hook eyelet 75 thereby longitudinally locating or registering snap hook 31 relative to applicator device 30. The user can apply a slight tension to line 77, and snap hook eyelet 75 will be pulled down against eyelet stud 68. This snugs up the snap hook in receptacle 44 so that it is relatively firmly held in the receptacle, even though the dimensions of the receptacle are preferably large enough to loosely receive the snap hook into the receptacle.

Line 77 is connected to a winch located on a boat trailer in a well-known manner. The individual whom is attempting to mount boat 36 upon the boat-trailer grasps a proximal end of placement pole 40 and line 77 and manipulates the position of placement pole 40 such that the individual can extend and position snap hook applicator device 30, along with snap hook 31 supported therein, proximate to the remotely located bow eyelet 32 of boat 36, despite the fact that the bow eyelet is out of arm's-length. Once snap hook 31 is located adjacent to bow eyelet 32, the individual latches snap hook 31 onto bow eyelet 32 by moving pole 40 laterally so as to engage and depress spring latch or keeper 74 until hook 73 hooks eyelet 32 and latch 74 snaps behind and captures eyelet 32. Once snap hook 31 is latched to bow eyelet 32, the user may disengage snap hook 31 from the applicator device 30 by moving the applicator laterally, and preferably by twisting the applicator device 30 about a longitudinal axis thereof, namely, about an axis which is coincident with and/or parallel to a longitudinal axis of placement pole 40, as shown in FIG. 3 and indicated by arrow X. The individual twists the applicator device approximately 30° to 90°, and most preferably approximately 90°, to release the snap hook from snap-hook-receiving receptacle 44. This allows complete disengagement of applicator device 30 from snap hook 31 while snap hook 31 is coupled to bow eyelet 32. Once snap hook 31 is releasably secured to bow eyelet 32, the individual may pull boat 36 toward and up onto the boat trailer simply by reeling-in line 77 with the winch on the boat trailer.

As will be understood, therefore, the method of the present invention includes the steps of positioning snap hook 31 in receptacle 44 of snap hook applicator device 30, coupling the snap hook to hook connector 32 using the snap hook applicator, and disengaging the applicator from the snap hook by displacement of said applicator device in a direction lateral to the snap hook, most preferably by twisting the applicator device by about 30° to about 90° about its longitudinal axis (about the longitudinal axis of pole 40).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An applicator device for coupling a snap hook to a hook connector, said applicator device comprising:

an integral applicator head defining a snap hook receiving receptacle formed to position the snap hook for, and to support the snap hook during, coupling of the snap hook to the hook connector while the snap hook is engaged in said receptacle; and said receptacle being further formed for disengagement of the applicator head from the snap hook while the snap hook is coupled to the hook connector upon displacement of the applicator head in a direction lateral to the snap hook.

2. The applicator device as defined in claim 1 wherein, said receptacle opens to a side of said applicator head for receipt of the snap hook into said receptacle and for disengagement of the snap hook from the applicator device.

3. The applicator device as defined in claim 1 wherein said applicator head is monolithically formed.

4. An applicator device for coupling a snap hook to a hook connector, said applicator device comprising:

an applicator head defining a snap hook receiving receptacle formed to position the snap hook for, and to support the snap hook during, coupling of the snap hook to the hook connector while the snap hook is engaged in said receptacle;

said receptacle being further formed for disengagement of the applicator head from the snap hook while the snap hook is coupled to the hook connector upon displacement of the applicator head in a direction lateral to the snap hook;

said receptacle is formed with a snap hook supporting upwardly facing base and upwardly extending side flanges on opposed sides of said base to define an upwardly facing opening to said receptacle dimensioned and configured to receive the snap hook therein; and said applicator head is rotatable about a longitudinal axis thereof to position said opening in an orientation for disengagement of said applicator head from said snap hook after rotation thereof.

5. An applicator device for coupling a snap hook to a hook connector, said applicator device comprising:

an applicator head defining a snap hook receiving receptacle formed to position the snap hook for, and to support the snap hook during, coupling of the snap hook to the hook connector while the snap hook is engaged in said receptacle;

said receptacle being further formed for disengagement of the applicator head from the snap hook while the snap hook is coupled to the hook connector upon displacement of the applicator head in a direction lateral to the snap hook; and said applicator head includes an eyelet stud positioned proximate said receptacle and formed and dimensioned to extend into an eyelet provided on the snap hook, said eyelet stud cooperating with said receptacle in positioning and supporting the snap hook during coupling to the hook connector, and said eyelet stud being further formed for removal from the eyelet on the snap hook upon lateral displacement of the applicator head relative to the snap hook.

6. The applicator device as defined in claim 5 wherein, said eyelet stud is formed for insertion into a snap hook eyelet having a line secured to the eyelet.

7. The applicator device as defined in claim 6 wherein, said eyelet stud is formed to hold the snap hook in said receptacle when a tension force is applied to the line in a direction away from the snap hook.

8. A snap hook holder for coupling a snap hook to a hook connector, said hook holder comprising:

a hook receptacle configured and dimensioned to position the snap hook in said receptacle for coupling to the hook connector;

an eyelet stud provided on said hook holder proximate said hook receptacle and configured and dimensioned to extend into an eyelet provided on the snap hook when the snap hook is engaged in said hook receptacle; and wherein, said hook receptacle and said eyelet stud are further dimensioned and configured for disengagement of said hook holder from the snap hook upon coupling of the snap hook to the hook connector and upon lateral displacement of said hook holder relative to the snap hook.

9. A snap hook holder according to claim 8 further comprising:

a base, said eyelet stud extending upward from said base;

a side wall extending upward from said base;

a holding flange extending from said side wall; and an interior flange extending upward from said base, said side wall, holding flange and interior flange collectively defining said hook receptacle.

10. A snap hook holder according to claim 8 wherein said base is substantially planar, said side wall and said interior flange extend substantially perpendicularly upward from said base, and said holding flange extends substantially parallel to said base.

11. A snap hook holder according to claim 8 wherein the holder is dimensioned and configured such that said holder is disengaged from the snap hook by twisting said holder approximately 30° to 90° about a longitudinal axis thereof.

12. A snap hook holder according to claim 8 further comprising an eyelet nib extend upward from said base parallel and adjacent to said eyelet stud for facilitating positioning of the snap hook with respect to said holder.

13. A combined boat hook and snap hook holder assembly for connecting a snap hook to a bow eyelet of a boat, said assembly comprising:

a holder shank;

a pole connector at one end of said shank for attachment to a distal end of a placement pole;

a pusher structure at an opposite end of said shank;

a boat hook attached to one side of said hank for hooking and pulling a boat; and a snap hook holder according to claim 8, said holder being attached to another side of said shank.

14. A combined boat hook and snap hook holder assembly for coupling a snap hook to bow eyelet of a boat, said assembly comprising:

a shank;

a pole connector at one end of said shank for attachment to a distal end of a placement pole;

a pusher structure at an opposite end of said shank;

a boat hook attached to one side of said shank for hooking and pulling a boat, and a snap hook holder attached to another side of said shank, said holder including:

a base;

a side wall extending upward from said base;

a holding flange extending from said side wall;

an interior flange extending upward from said base and parallel to said side wall, said side wall, holding flange and interior flange collectively forming a hook receptacle; and an eyelet stud extending upward from said base for extending into an eyelet of the snap hook when the snap hook is positioned in said hook receptacle to selectively engage said holder to the snap hook;

wherein the holder is dimensioned and configured such that it is disengaged from the snap hook by twisting said holder relative to the snap hook.

15. An assembly according to claim 14 wherein said base is substantially planar, said side wall and said interior flange each extend substantially perpendicularly upward from said base, and said holding flange extends substantially parallel to said base.

16. An assembly according to claim 14 further comprising an eyelet nib extending upward from said base parallel and adjacent to said eyelet stud for facilitating positioning of the snap hook within said holder.

17. An assembly according to claim 14 wherein the holder is dimensioned and configured such that it is disengaged from the snap hook by twisting said holder approximately 30° to 90° relative to the snap hook.

18. A method of using a snap hook holder for coupling a snap hook to a hook connector, said method consisting of the steps:

positioning the snap hook in a receptacle of an applicator device dimensioned and configured to position the snap hook for, and to support the snap hook during, coupling of the snap hook to the hook connector;

coupling the snap hook to the hook connector using the applicator device; and disengaging said applicator device from the snap hook while the snap hook is coupled to the hook connector by displacement of said applicator device in a direction lateral to the snap hook.

19. A method of using a snap hook holder for coupling a snap hook to a hook connector, said method comprising the steps:

positioning the snap hook in a receptacle of an applicator device dimensioned and configured to position the snap hook for, and to support the snap hook during, coupling of the snap hook to the hook connector;

coupling the snap hook to the hook connector using the applicator device; and disengaging said applicator device from the snap hook while the snap hook is coupled to the hook connector by displacement of said applicator device in a direction lateral to the snap hook;

wherein said disengaging step is accomplished by twisting said applicator device approximately 30° to 90° relative to the snap hook to allow disengagement of said holder from the snap hook.

20. A method of using a snap hook holder for coupling a snap hook to a hook connector, said method comprising the steps:

positioning the snap hook in a receptacle of an applicator device dimensioned and configured to position the snap hook for, and to support the snap hook during, coupling of the snap hook to the hook connector;

coupling the snap hook to the hook connector using the applicator device; and disengaging said applicator device from the snap hook while the snap hook is coupled to the hook connector by displacement of said applicator device in a direction lateral to the snap hook, said disengaging step is accomplished by twisting said applicator device approximately 30° to 90° relative to the snap hook to allow disengagement of said holder from the snap hook; and manipulating said holder in order to position the snap hook adjacent the hook connector and to engage the snap hook to the hook connector, wherein said twisting step is accomplished by twisting said holder relative to the snap hook after the snap hook is engaged with the hook connector.

21. An applicator device for coupling a snap hook to a hook connector, said applicator device comprising:

an applicator head defining a snap hook receiving receptacle formed to position the snap hook for, and to support the snap hook during, coupling of the snap hook to the hook connector while the snap hook is engaged in said receptacle; and said receptacle being further formed for disengagement of the applicator head from the snap hook while the snap hook is coupled to the hook connector upon twisting and laterally displacing the applicator head relative to the snap hook.

22. An applicator device for coupling a snap hook to a hook connector, said applicator device comprising:

an applicator head defining a snap hook receiving receptacle formed to position the snap hook parallel to the applicator head for, and to support the snap hook during, coupling of the snap hook to the hook connector while the snap hook is engaged in said receptacle; and said receptacle being further formed for disengagement of the applicator head from the snap hook while the snap hook is coupled to the hook connector upon displacement of the applicator head in a direction lateral to the snap hook.

\* \* \* \* \*